United States Patent [19]

Töllner

[11] Patent Number: 4,621,960
[45] Date of Patent: Nov. 11, 1986

[54] MULTIPLE-PART HOLDING ARRANGEMENT, IN PARTICULAR FOR CONCENTRICALLY ROTATING TOOLS

[75] Inventor: Klaus Töllner, Herrenberg-Kuppingen, Fed. Rep. of Germany

[73] Assignee: Montanwerke Walter GmbH, Tubingen, Fed. Rep. of Germany

[21] Appl. No.: 594,126

[22] Filed: Mar. 28, 1984

[30] Foreign Application Priority Data

Apr. 22, 1983 [DE] Fed. Rep. of Germany ....... 3314591

[51] Int. Cl.$^4$ .............................................. B23B 31/08
[52] U.S. Cl. ................................ 409/232; 279/41 R; 279/102; 409/234
[58] Field of Search ................... 409/232, 234, 233; 408/239 R, 239 A, 226, 238; 279/8, 4, 1 R, 41 A, 42, 43, 50, 1 N, 16, 18, 96, 102, 32

[56] References Cited

U.S. PATENT DOCUMENTS

| 2,626,667 | 1/1953 | Spiller | 279/41 |
| 2,820,640 | 1/1958 | Regan | 279/41 |
| 2,856,192 | 10/1958 | Schuster et al. | 279/43 X |
| 3,168,322 | 2/1965 | Dziodzic | 279/50 X |
| 3,554,080 | 1/1971 | Herrman | 409/234 |
| 3,863,940 | 2/1975 | Cummings | 279/43 X |

FOREIGN PATENT DOCUMENTS

| 0403514 | 10/1973 | U.S.S.R. | 409/232 |
| 544520 | 2/1977 | U.S.S.R. | 409/232 |

Primary Examiner—Gil Weidenfeld
Assistant Examiner—Glenn L. Webb
Attorney, Agent, or Firm—Frishauf, Holtz, Goodman & Woodward

[57] ABSTRACT

A receiver body (1) carries a holder shaft as needed and has on one end face an abutment face (4), extending at right angles to the axis of rotation, and a coaxial, conical receiving bore (5). A connection part (14), which is preferably embodied as a tool carrier, likewise has on one end face an abutment face (15, 15'), extending at right angles to the axis of rotation, as well as a coaxial, conical centering stub (16) fitting into the conical receiving bore. In order to assure a high degree of concentric accuracy, even in the event of strong forces exerted laterally upon the connection part, the inner cone (6) surface of the receiving bore (15) has a cone angle that is larger by a predetermined, small difference angle (27) than the outer cone surface (17) of the centering stub (16). This difference angle is such that upon the insertion of the centering stub into the receiving bore, the outer cone comes into engagement with the inner cone surface first in the vicinity of its smallest diameter. At least one of the two cones is elastically deformable so that the two cones engage one another over essentially their entire length and face and provide for matching engagement of the abutment faces (4, 15).

19 Claims, 3 Drawing Figures

MULTIPLE-PART HOLDING ARRANGEMENT, IN PARTICULAR FOR CONCENTRICALLY ROTATING TOOLS

The invention relates, in general to tool holders, especially to a multiple-part holding arrangement and, in particular for concentrically rotating tools. A receiving body which may carry a holding shaft has on one end face an abutment face extending at right angles to the axis of rotation as well as a coaxial, conical receiving bore. A connection part, preferably embodied as a tool carrier, also has on one end face an abutment face extending at right angles to the axis of rotation, as well as a conical centering stub fitting coaxially into the coaxial receiving bore. The holding arrangement further has a releasable holding device for axially tightening the receiving body and connection part so that they engage one another at the abutment faces.

BACKGROUND

In multiple-part tool holding arrangements for machine tools with provisions for automatic tool changing, the problem arises that upon tool changing, the connection part carrying the tool must be tightened with a high degree of concentricity against the receiver body that is connected to the machine tool spindle. To this end, holding arrangements have become known in practice, in which the centering stub of the connection part is embodied as a cylinder and can be pushed into a cylindrical receiving bore, of close tolerances, in the receiver body, until plane surfaces provided on the respective end faces of the connection part and the receiver body come into engagement with one another. Although it is possible for the forces exerted at right angles to the axis of rotation (that arise during chip-producing machining) to be absorbed via these plane surfaces resting on one another, still the degree of concentricity that is attainable is limited, because of the machining tolerances of the cylindrical surfaces of the centering stub and of the receiving bore. The connection between the receiver body and the connection part is also vulnerable to tilting when the two parts are joined. If the centering stub is not aligned precisely coaxially with the receiving bore, then damage occurs to the centering stub or the receiving bore, impairing concentricity or even making it difficult or impossible to release the connection between the two parts. In order to facilitate joining, the centering stub and the receiving bore have in the prior art already been embodied in stepped fashion.

In other known holding arrangements, a conical connection between the connection part and the receiver body has been used, in accordance with customary industrial standards, such as standard tapers. The cone angle tolerances are designed such that the outer conical surface of the centering stub in any case bars the load at its maximum diameter, so as to attain maximum stability of the connection. In applications in which very strong forces are exerted upon the connection part at right angles to the axis of rotation, however, it is no longer possible for the cooperating conical surfaces alone to absorb such forces with sufficient stability.

Therefore if relatively strong lateral forces must be expected, then in addition the receiver body and the connection part must be provided with accurately ground plane surfaces extending at right angles to the axis of rotation, which upon the joining of the two parts are tightened by the tightening or holding device so that they rest on one another. However, in order to attain a connection between two parts that involves a receiving cone and a planar surface, the most stringent possible accuracy in machining is required, because the connection is overdefined. If the outer cone surface of the centering stub and the inner cone surface of the receiving bore are realized such that one fits precisely inside the other, then a gap will still remain between the two plane surfaces; alternatively, if the two plane surfaces are intended to rest exactly against one another, then a certain amount of air must be present between the outer and inner cone surfaces.

THE INVENTION

It is accordingly an object of the invention to create a holding arrangement in which, even in the event of strong forces exerted laterally upon the connection part, a high degree of concentricity is assured, without having to make excessive demands in terms of manufacturing precision and without having to experience difficulties in joining the connection part to the receiver body, that is, without any danger of tilting.

Briefly, the inner cone surface of the receiving bore has a cone angle that is larger by a predetermined, small difference angle than the outer cone surface of the centering stub, such that upon the insertion of the centering stub into the receiving bore, the outer cone surface first comes into engagement with the inner cone surface in the vicinity of the smallest diameter of the outer cone; furthermore, the centering stub and/or the receiver body, that is, at least one of the two cones, is elastically deformable. During the axial tightening of the connection part and the receiver body together, they will first preliminarily come in engagement, and then the two cones will come in engagement over essentially their entire length and face.

The conical centering stub can be pushed in a simple manner into the conical receiving bore of the receiver body without requiring overly stringent care, until this stub comes to rest in the vicinity of its smallest diameter on the inner cone surface of the receiving bore. Centering of the connection part with respect to the receiver body is automatically accomplished in this process. This centering is maintained precisely during the elastic deformation of the outer and/or inner conical surface occurring as the tightening operation continues, and at the same time the abutment face of the connection part comes to rest completely against the abutment face of the receiver body, and the two parts are held tightened against one another in this state by the holding device. Excellent accuracy of concentricity is thereby assured on the one hand, and on the other the connection between the connection part and the receiver body is capable of absorbing even large forces exerted laterally upon the connection part, such as arise during heavy chip-producing machining.

It has proved to be particularly advantageous if the angle by which the cone angle of the outer and inner cone surfaces differ from one another is in the range of about 20 angular minutes or therebelow.

In principle, both the receiver body and the centering stub can be embodied, in the vicinity of the inner or outer cone surface, by appropriate constructional provisions with a wall thickness such that the desired elastic deformation is possible. Very simple structural conditions are attained, however, if substantially it is only the outer cone surface of the centering stub, which has a coaxial bore, that is elastically deformable, because the bore can easily be selected of such diameter and in other respects embodied such that the centering stub is provided with the necessary elastic deformability in the vicinity of its outer cone surface.

If the abutment faces of the receiver body and of the connection part are plane surfaces extending precisely at right angles to the axis of rotation, then—depending on existing manufacturing tolerances—the danger may arise that a wedge-shaped annular gap remains between the abutment faces in the vicinity of their greatest diameter, which would impair the flexural strength of the holding arrangement. To preclude this, it is advantageous for the abutment faces to be so formed that during the tightening operation they come into engagement with one another first in the area of the largest diameter. As the axial tightening movement continues, then a slight elastic deformation ensues in this area of the largest diameter, and under its influence the abutment faces enter into engagement with one another increasingly, continuing radially from the outside inward, until they essentially engage one another over their entire length and face.

In order to attain this, at least one of the abutment faces may be conical; however, the arrangement may also be such that at least one of the abutment faces has, in the vicinity of its largest diameter, an axially slightly protruding annular face area, which is elastically deformable in the manner described.

The drawing illustrates an exemplary embodiment of the invention.

DRAWING

DESCRIPTION OF THE PREFERRED EMBODIMENT

Figure 1:
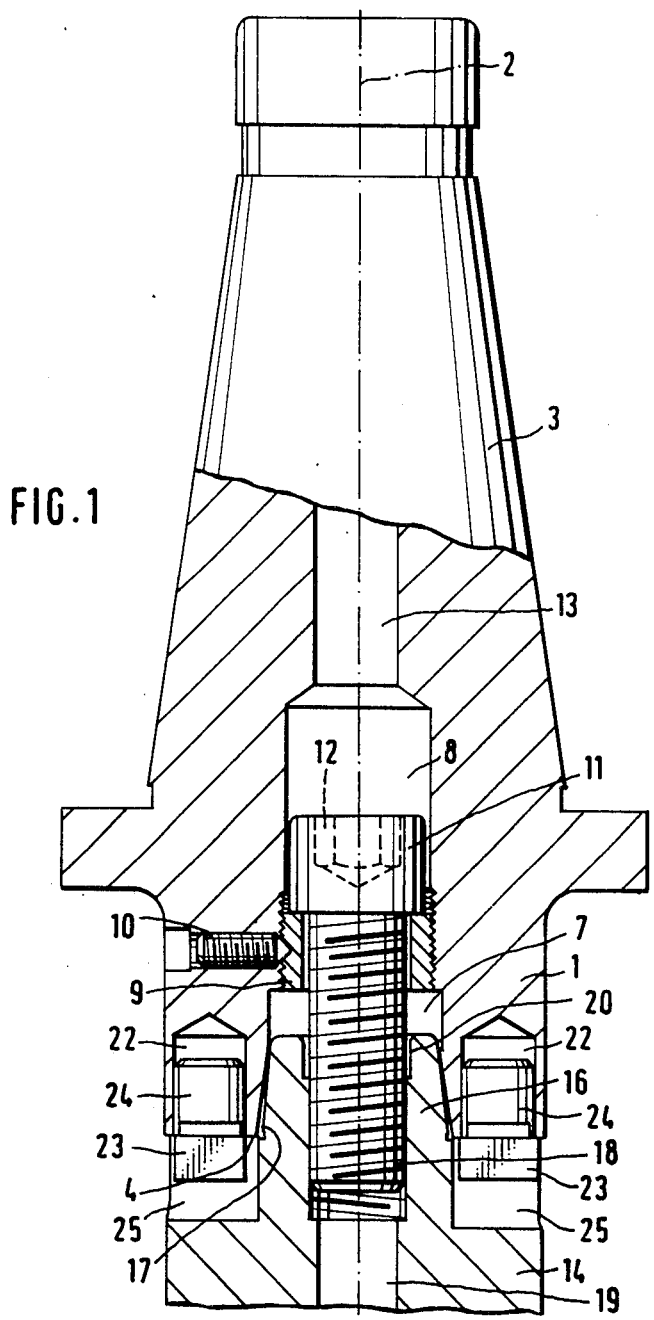
FIG. 1 shows a tool holding arrangement according to the invention, in axial section, in a side view.

A substantially cylindrical receiver body element 1 has a holding shaft 3 that is coaxial with the axis of rotation 2 and embodied as a steeply inclined cone. In a known manner, the receiver body 1 can be connected with this holding shaft 3 to the spindle, not otherwise shown, of a machine tool, for instance a milling machine. On the end face opposite from the holding shaft 3, the receiver body 1 is provided with a ground plane surface 4 extending at right angles to the axis of rotation 2, and a receiving bore 5 that is coaxial with the axis of rotation 2 extends from the plane surface 4 into the receiver body 1. The receiving bore 5 is embodied as a circular cone, and its inner cone surface is shown at 6 (see FIG. 2). Adjoining the receiving bore 5 is a coaxial, cylindrical recess 7 hollowed out by turning, the diameter of which is greater than the smallest diameter of the inner cone surface 6. A support ring 9 is inserted into a bore 8 that follows the hollowed-out recess 7 in the axial direction and is likewise coaxial with the axis of rotation 2. The support ring 9 is fixed in a stable position by means of radial threaded pins 10 and it serves to support a socket-head screw 11, having a hexagonal socket 12 for instance, the hexagonal socket 12 of which is accessible via a passageway bore 13 from the rear of the receiver body 1 by means of a correspondingly shaped wrench.

A coaxial cylindrical connection part element 14 is connected with a high degree of concentricity with the receiver body 1, serving as a carrier for a tool not otherwise shown, such as a milling tool.

The connection part element 14 is formed, on its end face oriented toward the receiver body element 1, with a plane surface 15 (FIG. 2), which extends at right angles to the axis of rotation 2 and is ground. The connection part 14 furthermore has on this end face a coaxially protruding centering stub 16, which is likewise conical, and the outer conical surface of which is shown at 17. Extending through the centering stub 16 is a coaxial threaded bore 18, into which the socket-head screw 11 is screwed (FIG. 1), which together with the threaded bore 18 forms an axially acting tightening or holding device. Above the threaded part of the socket-head screw 11, the threaded bore 18 continues as a coaxial, smooth-walled, cylindrical bore 19 of the connection part 14.

In the vicinity of its free end face, the centering stub 16 is provided with a hollowed-out recess 20 coaxial with the axis of rotation. This recess 20 extends over a predetermined portion of the axial length of the centering stub 16 and its significance will be explained in detail further below.

In the vicinity of its base, the centering stub 16 is formed at 21 (FIG. 2) with a continuous, groove-like indentation, which is adjoined by a circular-annular indentation 22 in the vicinity of the plane surface 15. Both indentations 21, 22 serve to facilitate the machining of the outer cone surface 17 and the plane surface 15.

Finally, the receiver body 1 has in the vicinity of its plane surface 4 two axially parallel, cylindrical blind bores 22, into which two tappets 23 having a cylindrical shaft 24 are pressed, the tappets 23 protruding beyond the plane surface 4. The tappets 23, which are rectangular in cross section, engage corresponding grooves 25 in the vicinity of the plane surface 15 of the connection part 14 and assure a positionally correct, rotationally fixed connection between the connection part 14 and the receiver body 1.

Figure 2:
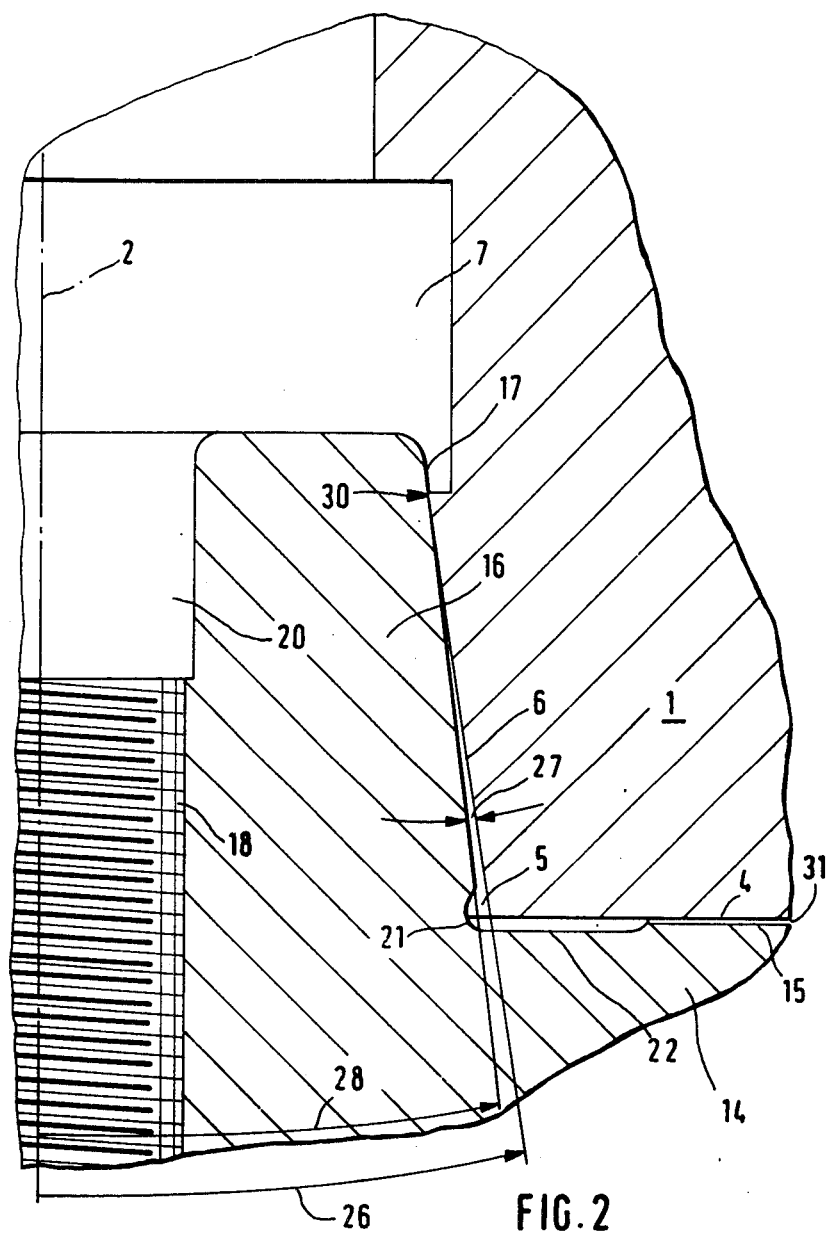
FIG. 2 shows the tool holding arrangement according to FIG. 1, in a side view of a detail thereof, showing the centering stub, the connection part and the receiving bore of the receiver body, on a different scale.

As shown particularly in FIG. 2, the cone angle 26 of the inner cone surface 6 of the receiving bore 5 is greater, by a small difference angle indicated at 27, than the cone angle 28 of the outer cone surface 17 of the centering stub 16. The difference angle 27 is normally on the order of magnitude of about 20 angular minutes or therebelow; it may also be larger, particularly in the case of very large centering stubs 16 and receiving bores 5.

The difference between the cone angle 26 of the inner cone surface 6 and the cone angle 28 of the outer cone surface 17 causes the outer cone surface 17 to come into contact, upon the insertion of the centering stub 16 into the receiving bore 5, with the inner cone surface 6 first in the vicinity of its smallest diameter, at 30. This is possible because the centering stub 16 protrudes freely with its end into the hollowed-out recess 7 of larger diameter.

If the socket-head screw 11 is then tightened fully, then the centering stub 16 is drawn with corresponding force farther into the receiving bore 5. The outer conical surface 17 of the centering stub 16 then undergoes an increasing elastic deformation, beginning in the area 30 of its smallest diameter, so that the outer cone surface 17 comes into engagement over larger and larger surface areas with the inner cone surface 6, until a complete engagement between the two cones is attained over essentially their entire length and face once the two plane surfaces 4, 15 rest against one another; that is, once the gap indicated at 31 in FIG. 2 between these two plane surfaces 4, 15 is completely closed.

The elastic deformation, in the sense of a reduction of the outer diameter of the centering stub 16 in the area of its outer cone surface 17, is as a result of the recess 20, the diameter of which is selected such that the annular portion of the centering stub 15 surrounding the recess 20 is capable of yielding elastically.

Alternatively, the arrangement may also be such that the receiving body element 1 is weakened in the area surrounding the inner cone surface 6 by dimensioning its wall thickness accordingly, by providing annular grooves or the like, such that the inner cone surface 6 is elastically expandable in width by the required amount. It would also be conceivable for both the outer cone surface 17 and the inner cone surface 6 to be embodied as elastically deformable.

The two conical surfaces 6, 17 which are circumferentially continuous, cooperating with one another assure exact centering of the connection part 14 with respect to the receiver body 1, while the plane surfaces 4, 15 engaging one another completely over virtually their entire surface area assure precise alignment of the connection part 14 with the receiving body 1 and furthermore enable the absorption of even large forces exerted laterally upon the connection part 14.

Figure 2A:
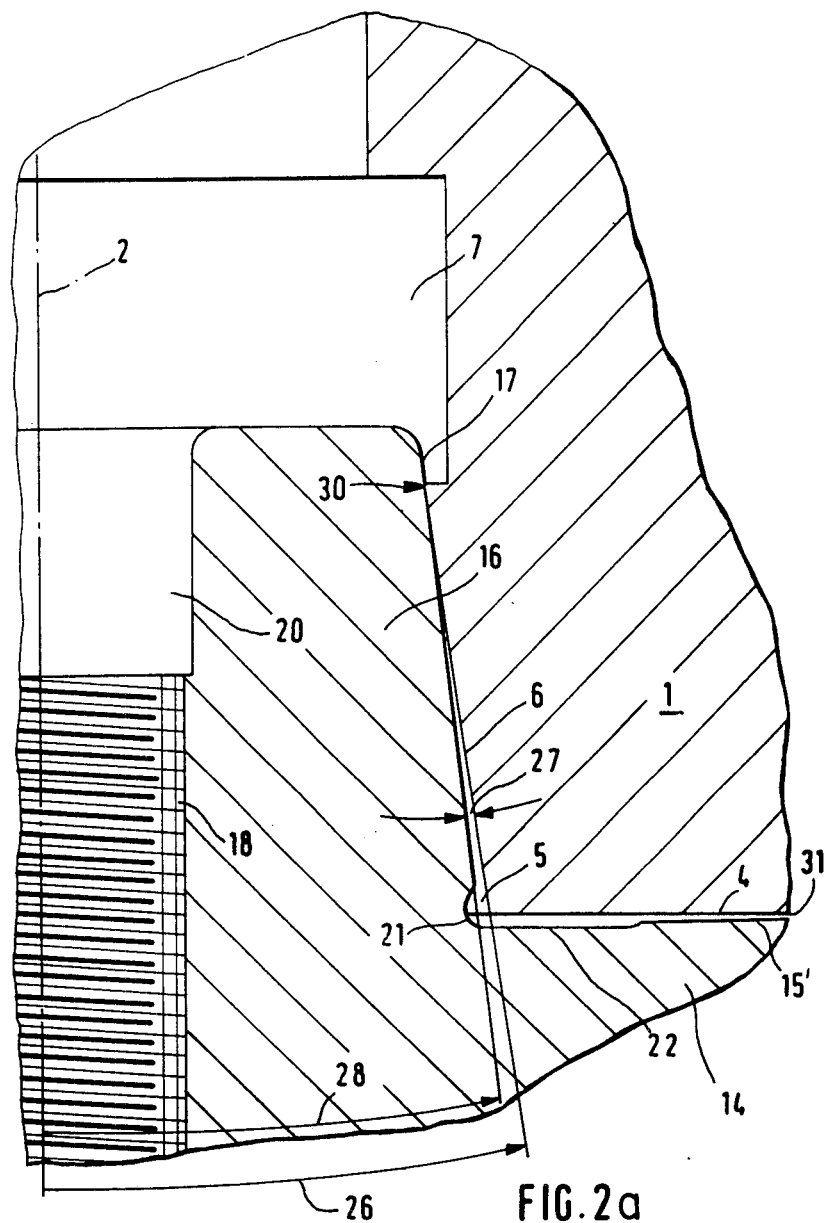
FIG. 2a is a fragmentary view showing a modification.

In the described exemplary embodiment, the receiving body element 1 and the connection part element 14 are each formed with respective ground plane surfaces 4 and 15, as abutment faces, extending precisely at right angles to the axis of rotation 2. In order to assure, regardless of manufacturing tolerances, that the two abutment faces 4, 15 will during tightening come into engagement with one another in the vicinity of their largest diameter, the plane surface 4 and/or 15 may be replaced, as shown in FIG. 2a, by a slightly conical abutment face 15' which extends obliquely inward with respect toward the axis of rotation 2. Alternatively, the arrangement may also be selected such that at least one of the plane surfaces 4, 15 has in the vicinity of its largest diameter an axially slightly protruding annular face area, resulting in principle in the same arrangement as is shown in FIG. 2 with respect to the indentation 22 and the plane surface 15.

In both cases, during the axial tightening an elastic deformation occurs in the vicinity of the largest diameter of the abutment faces 4 and 15 or 15' which come into engagement with one another first in that vicinity; being continued radially inward, this results in an engagement of the abutment faces 4, and 15 or 15' with one another over a large surface area in an annular engagement area.

In this manner, the situation where an annular gap of wedge-shaped cross section remains between the abutment faces in the area of their largest diameter, which could impair the flexural strength of the holding arrangement, is reliably precluded.

The holding arrangement has been described above in terms of its application to a tool holding system. In principle, however, the concept of the invention is also suitable for joining other parts to one another, whenever it is important for the parts that are held together to be distinguished by a high degree of concentric accuracy, even under conditions of severe lateral stress.

I claim:

1. Multiple-part holding arrangement for a rotating body, particularly for a concentrically rotating tool, having
    a receiver body element (1) formed with a coaxial receiving bore (5) having an inner cone surface (6);
    a connection part element (14) having a coaxial centering stub (16) formed with an outer cone surface (17) fitting into the inner cone surface (6) of the receiving bore (5); and
    a releasable holding device (11, 12) axially tightening the receiver body element and the connection part element together,
   wherein,
    the receiver body element (1) is formed with a receiver abutment face (4) extending at least approximately at right angle to the axis of rotation;
    the connection part element (14) is formed with a connection abutment face (15, 15') extending at least approximately at right angle to the axis of rotation, said abutment faces being positioned in approximate axial alignment for mutual engagement;
    the inner cone surface (6) of the receiving bore (5) has a cone angle (26) which is larger, by a predetermined small difference angle (27) than the cone angle of the outer cone surface (17) of the centering stub (16) for mutual engagement, upon introduction of the centering stub (16) into the receiving bore (5) of the outer cone surface (17) with the inner cone surface (6) initially in the vicinity of the smallest diameter (30) of the outer cone surface (17);
    and wherein at least one of the elements (1, 14) is elastically deformable in radial direction to provide for elastic deformation of its respective cone surface engaging the matching cone surface of the other element upon axial tightening of the receiver body element (1) and the connection part element (14) axially towards each other by the releasable holding device (11, 12) until the abutment faces (4, 15, 15') mutually engage, and wherein the centering stub (16) is formed with a central coaxial bore (18, 20) to provide for radial elastic deformation of the connecting part element.

2. Holding arrangement, according to claim 1, wherein the difference angle (27) is up to about 20 angular minutes.

3. Holding arrangement according to claim 1, wherein the centering stub (16) is formed with a threaded bore (18) to receive the releasable holding device;
    and said stub (16) is further formed with a bore portion (20) of larger diameter than said threaded bore (18) in the region of the free end of the centering stub in the vicinity of the smallest diameter (30) of the outer cone surface (17) to provide for elastic, radial deformation of the centering stub radially inwardly without constraint by the presence of a threaded bolt (11) within the threaded bore and forming at least part of the releasable holding device.

4. Holding arrangement according to claim 1, wherein the connection part element (14) only is radially elastically deformable.

5. Holding arrangement according to claim 1, wherein the abutment faces (4, 15) are respectively shaped to provide for mutual engagement, upon tightening of the releasable holding device, first in the area of the largest diameter thereof.

6. Holding arrangement according to claim 1, wherein at least one (15') of the abutment faces (4, 15") is slightly inwardly conical to provide for engagement of the slightly conical abutment surface (15') with the matching abutment surface (4) in the region of the largest diameter of said surfaces (4, 15').

7. Holding arrangement according to claim 1, wherein at least one (15) of the abutment faces (4, 15) is formed in the region of its larger diameter, with a zone which protrudes slightly axially beyond the surface in the region of a smaller inner diameter.

8. Holding arrangement according to claim 1, wherein said cone surfaces (6, 17) are circumferentially continuous.

9. Multiple-part holding arrangement for a rotating body, particularly for a concentrically rotating tool, having
a receiver body element (1) formed with a coaxial receiving bore (5) having an inner cone surface (6);
a connection part element (14) having a coaxial centering stub (16) formed with an outer cone surface (17) fitting into the inner cone surface (6) of the receiving bore (5); and
a releasable holding device (11, 12) axially tightening the receiver body element and the connection part element together,
wherein
the receiver body element (1) is formed with a receiver abutment face (4) extending at least approximately at right angle to the axis of rotation;
the connection part element (14) is formed with a connection abutment face (15, 15') extending at least approximately at right angle to the axis of rotation, said abutment faces being positioned in approximate axial alignment for mutual engagement;
the inner cone surface (6) of the receiving bore (5) has a cone angle (26) which is larger, by a predetermined small difference angle (27) than the cone angle of the outer cone surface (17) of the centering stub (16) for mutual engagement, upon introduction of the centering stub (16) into the receiving bore (5) of the outer cone surface (17) with the inner cone surface (6) initially in the vicinity of the smallest diameter (30) of the outer cone surface (17);
wherein at least one of the elements (1, 14) is elastically deformable in radial direction to provide for elastic deformation of its respective cone surface engaging the matching cone surface of the other element upon axial tightening of the receiver body element (1) and the connection part element (14) axially towards each other by the releasable holding device (11, 12) until the abutment faces (4, 15, 15') mutually engage, the centering stub (16) is formed with a threaded bore (18) to receive the releasable holding device; and
wherein said stub (16) is further formed with a bore portion (20) of larger diameter than said threaded bore (18) in the region of the free end of the centering stub in the vicinity of the smallest diameter (30) of the outer cone surface (17) to provide for elastic, radial deformation of the centering stub radially inwardly without constraint by the presence of a threaded bolt (11) within the threaded bore and forming at least part of the releasable holding device.

10. Holding arrangement according to claim 9, wherein the difference angle (27) is up to about 20 angular minutes.

11. Holding arrangement according to claim 9, wherein the connection part element (14) only is radially elastically deformable.

12. Holding arrangement according to claim 9, wherein the abutment faces (4, 15) are respectively shaped to provide for mutual engagement, upon tightening of the releasable holding device, first in the area of the largest diameter thereof.

13. Multiple-part holding arrangement for a rotating body, particularly for a concentrically rotating tool, having
a receiver body element (1) formed with a coaxial receiving bore (5) having an inner cone surface (6);
a connection part element (14) having a coaxial centering stub (16) formed with an outer cone surface (17) fitting into the inner cone surface (6) of the receiving bore (5); and
a releasable holding device (11, 12) axially tightening the receiver body element and the connection part element together,
wherein
the receiver body element (1) is formed with a receiver abutment face (4) extending at least approximately at right angle to the axis of rotation;
the connection part element (14) is formed with a connection abutment face (15, 15') extending at least approximately at right angle to the axis of rotation, said abutment faces being positioned in approximate axial alignment for mutual engagement;
the inner cone surface (6) of the receiving bore (5) has a cone angle (26) which is larger, by a predetermined small difference angle (27) than the cone angle of the outer cone surface (17) of the centering stub (16) for mutual engagement, upon introduction of the centering stub (16) into the receiving bore (5) of the outer cone surface (17) with the inner cone surface (6) initially in the vicinity of the smallest diameter (30) of the outer cone surface (17);
and wherein at least one of the elements (1, 14) is elastically deformable in radial direction to provide for elastic deformation of its respective cone surface engaging the matching cone surface of the other element upon axial tightening of the receiver body element (1) and the connection part element (14) axially towards each other by the releasable holding device (11, 12) until the abutment faces (4, 15, 15') mutually engage, and
wherein at least one (15') of the abutment faces (4, 15") is slightly inwardly conical to provide for engagement of the slightly conical abutment surface (15') with the matching abutment surface (4) in the region of the largest diameter of said surfaces (4, 15').

14. Holding arrangement according to claim 13, wherein the difference angle (27) is up to about 20 angular minutes.

15. Holding arrangement according to claim 13, wherein the connection part element (14) only is radially elastically deformable.

16. Multiple-part holding arrangement for a rotating body, particularly for a concentrically rotating tool, having
- a receiver body element (1) formed with a coaxial receiving bore (5) having an inner cone surface (6);
- a connection part element (14) having a coaxial centering stub (16) formed with an outer cone surface (17) fitting into the inner cone surface (6) of the receiving bore (5); and
- a releasable holding device (11, 12) axially tightening the receiver body element and the connection part element together, wherein the receiver body element (1) is formed with a receiver abutment face (4) extending at least approximately at right angle to the axis of rotation;

the connection part element (14) is formed with a connection abutment face (15, 15') extending at least approximately at right angle to the axis of rotation, said abutment faces being positioned in approximate axial alignment for mutual engagement;

the inner cone surface (6) of the receiving bore (5) has a cone angle (26) which is larger, by a predetermined small difference angle (27) than the cone angle of the outer cone surface (17) of the centering stub (16) for mutual engagement, upon introduction of the centering stub (16) into the receiving bore (5) of the outer cone surface (17) with the inner cone surface (6) initially in the vicinity of the smallest diameter (30) of the outer cone surface (17);

and wherein at least one of the elements (1, 14) is elastically deformable in radial direction to provide for elastic deformation of its respective cone surface engaging the matching cone surface of the other element upon axial tightening of the receiver body element (1) and the connection part element (14) axially towards each other by the releasable holding device (11, 12) until the abutment faces (4, 15, 15') mutually engage, and wherein at least one (15) of the abutment faces (4, 15) is formed in the region of its larger diameter, with a zone which protrudes slightly axially beyond the surface in the region of a smaller inner diameter.

17. Holding arrangement according to claim 16, wherein the difference angle (27) is up to about 20 angular minutes.

18. Holding arrangement according to claim 16, wherein the centering stub (16) is formed with a central coaxial bore (18, 20) to provide for radial elastic deformation of the connecting part element.

19. Holding arrangement according to claim 16, wherein the connection part element (14) only is radially elastically deformable.

* * * * *